United States Patent
Hayabuchi et al.

(10) Patent No.: US 7,294,087 B2
(45) Date of Patent: Nov. 13, 2007

(54) AUTOMATIC TRANSMISSION

(75) Inventors: Masahiro Hayabuchi, Anjo (JP); Masaaki Nishida, Anjo (JP); Satoru Kasuya, Anjo (JP); Toshihiko Aoki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 201 days.

(21) Appl. No.: 10/902,831

(22) Filed: Aug. 2, 2004

(65) Prior Publication Data

US 2005/0037889 A1    Feb. 17, 2005

(30) Foreign Application Priority Data

Aug. 14, 2003  (JP)  ............................. 2003-207577

(51) Int. Cl.
*F16H 3/62*    (2006.01)
(52) U.S. Cl. ..................... 475/276; 475/278; 475/280; 475/282; 475/286; 475/288; 475/311; 475/317; 475/323; 475/330

(58) Field of Classification Search ............... 475/276, 475/278, 280, 282, 284, 286, 288, 311, 317, 475/323, 330
See application file for complete search history.

(56) References Cited

U.S. PATENT DOCUMENTS

| 6,723,018 | B2 * | 4/2004 | Hayabuchi et al. ......... 475/276 |
| 6,752,738 | B1 * | 6/2004 | Martin et al. ............... 475/276 |
| 7,014,589 | B2 * | 3/2006 | Stevenson ................... 475/284 |
| 2003/0078132 | A1 * | 4/2003 | Tabata et al. ............... 475/280 |
| 2003/0216211 | A1 | 11/2003 | Miyazaki et al. |
| 2005/0037889 | A1 | 2/2005 | Hayabuchi et al. |

FOREIGN PATENT DOCUMENTS

JP         A 4-219553        8/1992

* cited by examiner

*Primary Examiner*—David D. Le
(74) *Attorney, Agent, or Firm*—Oliff & Berridge, PLC

(57) ABSTRACT

An automatic transmission including a mechanical reduction gear connected to an input shaft that generates a decelerated rotation smaller than a rotation of the input shaft from a decelerated rotating member and a compound planetary gear for shifting with a first element, a second element, a third element, a fourth element, and a fifth element.

12 Claims, 13 Drawing Sheets

|  | C-1 | C-2 | C-3 | B-1 | B-2 | B-3 |
|---|---|---|---|---|---|---|
| 1st | ● |  |  |  |  | ● |
| 2nd | ● |  |  |  | ● |  |
| 3rd | ● |  |  | ● |  |  |
| 4th | ● |  | ● |  |  |  |
| 5th | ● | ● |  |  |  |  |
| 6th |  | ● | ● |  |  |  |
| 7th |  | ● |  | ● |  |  |
| REV1 |  |  | ● |  |  | ● |
| REV2 |  |  | ● |  | ● |  |

FIG. 2

|  | C-1 | C-2 | C-3 | B-1 | B-2 | B-3 |
|---|---|---|---|---|---|---|
| 1st | ● |  |  |  |  | ● |
| 2nd | ● |  |  |  | ● |  |
| 3rd | ● |  |  | ● |  |  |
| 4th | ● |  | ● |  |  |  |
| 5th | ● | ● |  |  |  |  |
| 6th |  | ● | ● |  |  |  |
| 7th |  | ● |  | ● |  |  |
| 8th |  | ● |  |  | ● |  |
| REV1 |  |  | ● |  |  | ● |
| REV2 |  |  | ● |  | ● |  |

FIG. 10

AUTOMATIC TRANSMISSION

INCORPORATION BY REFERENCE

The disclosure of Japanese Patent Application No. 2003-207577 filed on Aug. 14, 2003 including the specification, drawings and abstract are incorporated herein by reference in its entirety.

BACKGROUND OF THE INVENTION

1. Field of Invention

The invention relates to an automatic transmission in which an input shaft and a mechanical reduction gear that decelerates rotation of the input shaft are connected to and capable of engaging/disengaging with each element of a compound planetary gear.

2. Description of Related Art

In Japanese Patent Laid-Open Publication No. 4-219553 (refer to FIG. 13 and paragraphs [0070] and [0071]), an automatic transmission that achieves gear ratios for six forward speeds and one reverse speed is provided. The automatic transmission includes a single pinion planetary gear that is used for deceleration and includes a ring gear connected to an input shaft, a sun gear fixed to a transmission case, and a carrier that rotatably supports a pinion meshed with the ring gear and sun gear. The automatic transmission also includes a compound planetary gear for shifting and includes first and second sun gears, combined first and second carriers that rotatably support a long pinion meshed with the first sun gear and an intermediate pinion meshed with the long pinion and the second sun gear, and combined first and second ring gears that mesh with the long pinion.

The first and second ring gears which are combined to the compound planetary gear for shifting are constantly connected to an output shaft. The rotation of a carrier of the single pinion planetary gear that is used for deceleration, the rotational speed of the input shaft thus being reduced, is selectively transmitted to the first and second sun gears of the planetary gear for shifting by a first and third clutches. The rotation of the input shaft is selectively transmitted to the combined first and second carriers of the compound planetary gear for shifting by a second clutch. Moreover, the first sun gear of the compound planetary gear that is used for shifting and the combined first and second carriers are selectively stopped from rotating by first and second brakes.

SUMMARY OF THE INVENTION

The conventional automatic transmission described above has a short overall length and is suitable for front wheel drive vehicles with a transverse engine. However, an automatic transmission capable of achieving appropriately spaced gear ratios for seven forward speeds or more has been called for in recent years in order to improve fuel economy and power transmission performance, as well as obtain a gear ratio that matches a driver's preference.

In order to meet such demands, the invention thus provides, among other things, an automatic transmission capable of achieving highly efficient gear ratios for seven forward speeds or more, a superior shift feeling and little change in vehicle speed during gear change. An automatic transmission is also provided in which an element is added to a compound planetary gear for shifting to further compress the gear ratios.

According to a first exemplary aspect of the invention, an automatic transmission includes a mechanical reduction gear connected to an input shaft that generates a decelerated rotation smaller than a rotation of the input shaft from a decelerated rotating member and a compound planetary gear for shifting with a first element, a second element, a third element, a fourth element, and a fifth element. The first element is capable of being connected to the decelerated rotating member via a third clutch and capable of being stopped from rotating by a first brake, the second element is capable of being stopped from rotating by a second brake, the third element is capable of being stopped from rotating by a third brake, with either the second element or the third element capable of being connected to the input shaft via a second clutch, the fourth element is connected to an output shaft, the fifth element is capable of being connected to the decelerated rotating member via a first clutch, and at least seven forward speed ratios can be established.

According to another exemplary aspect of the invention, an automatic transmission includes a mechanical reduction gear connected to an input shaft that generates a decelerated rotation smaller than a rotation of the input shaft from a decelerated rotating member and a compound planetary gear for shifting with a first element, a second element, a third element, a fourth element and a fifth element that each correspond in order to five elements sequentially aligned at intervals corresponding to gear ratios in a velocity diagram. The first element is capable of being connected to the decelerated rotating member via a third clutch and capable of being stopped from rotation by a first brake, the second element is capable of being connected to the input shaft via a second clutch and capable of being stopped from rotation by a second brake, the third element is capable of being stopped from rotation by a third brake, the fourth element is connected to an output shaft, and the fifth element is capable of being connected to the decelerated rotating member via a first clutch.

According to an exemplary aspect of the invention, it is thus possible to provide an automatic transmission capable of shifting and transmitting to the output shaft at gear ratios of multiple speeds that appropriately space the rotation of the input shaft. In addition, the change in gear ratio decreases during gear changes at low gear speeds, thereby obtaining a superior shift feeling when the vehicle starts traveling. Each gear speed can be achieved with only the operation of two among the first through third clutches and first through third brakes, and switching over to an adjacent gear speed can be achieved by only switching over one of the operating clutch or brake.

According to another exemplary aspect of the invention, an automatic transmission includes a mechanical reduction gear connected to an input shaft that generates a decelerated rotation smaller than a rotation of the input shaft from a decelerated rotating member and a compound planetary gear for shifting with a first element, a second element, a third element, a fourth element, and a fifth element that each correspond in order to five elements sequentially aligned at intervals corresponding to gear ratios in a velocity diagram. The first element is capable of being connected to the decelerated rotating member via a third clutch and capable of being stopped from rotation by a first brake, the second element is capable of being stopped from rotation by a second brake, the third element is capable of being connected to the input shaft via a second clutch and capable of being stopped from rotation by a third brake, the fourth element is connected to an output shaft and the fifth element is capable of being connected to the decelerated rotating member via a first clutch.

According to another exemplary aspect of the invention, it is thus possible provide an automatic transmission capable of shifting and outputting to the output shaft at gear ratios of multiple speeds that appropriately space the rotation of the input shaft. In addition, it is possible to further compress the gear ratios on the high speed side, thereby drawing out optimum engine performance at vehicle speeds in high speed zones. Moreover, the change in gear ratio decreases during gear changes, thereby obtaining a superior shift feeling. Each gear speed can also be achieved with only the operation of two among the first through third clutches and first through third brakes.

BRIEF DESCRIPTION OF THE DRAWINGS

Various embodiments of the invention will be described with reference to the drawings, wherein:

FIG. 2 is a drawing showing engagement states of brakes and clutches in each gear speed of the first embodiment;

FIG. 10 is a drawing showing engagement states of brakes and clutches in each gear speed of the fourth embodiment;

DETAILED DESCRIPTION OF PREFERRED EMBODIMENTS

Figure 1:
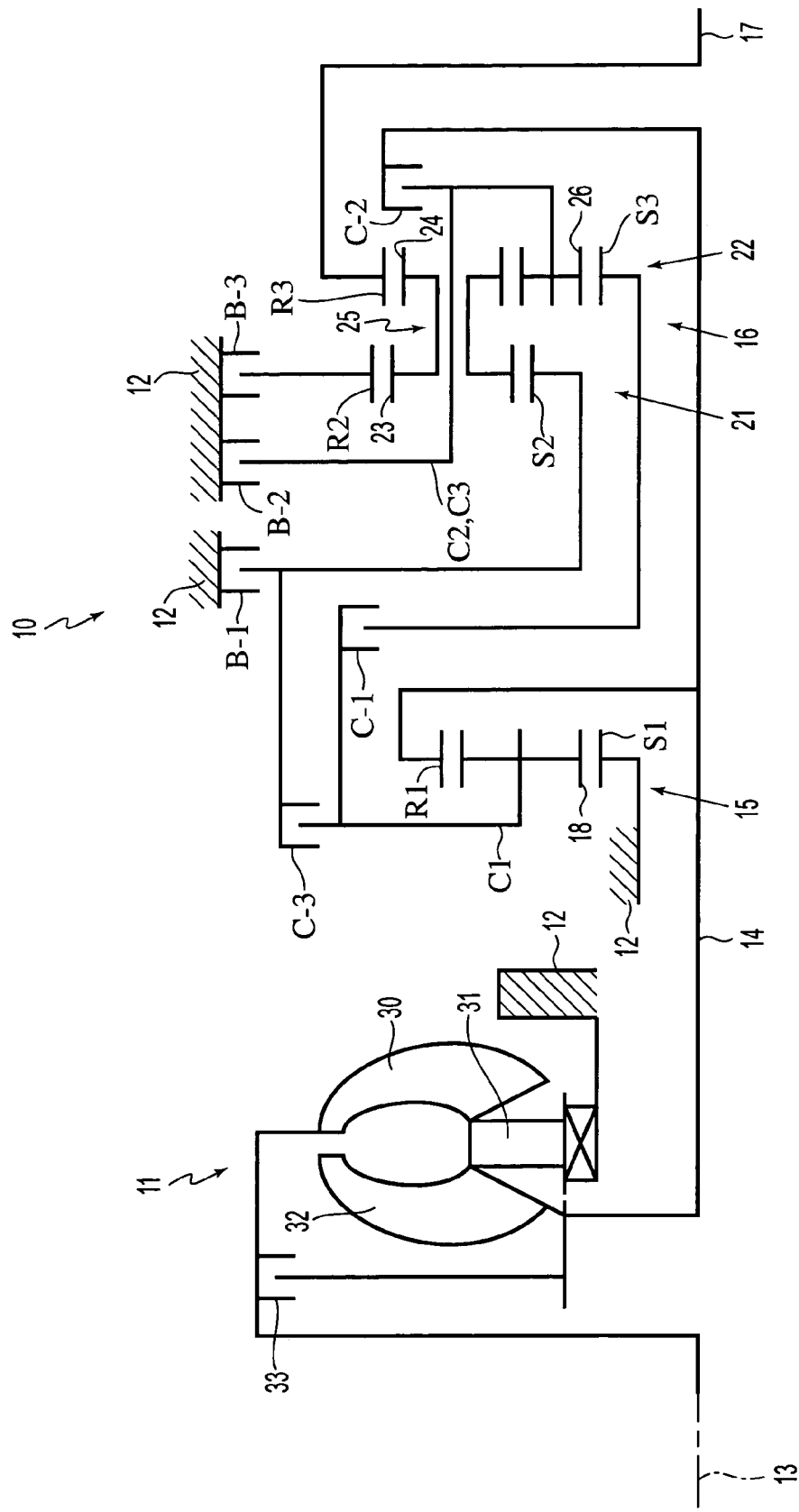
FIG. 1 is a skeleton drawing showing a first embodiment of an automatic transmission according to the invention.

Hereinafter, a first embodiment of an automatic transmission according to the invention will be described based upon the accompanying drawings. In FIG. 1, reference numeral 10 denotes an automatic transmission according to the invention, for example, the automatic transmission 10 is one that shifts and transmits an output rotation of a fluid torque converter 11 rotationally driven by a vehicle engine to a drive wheel. The automatic transmission 10 is structured with an input shaft 14 sequentially and rotatably supported on a common axis line 13 within a transmission case 12 mounted in a vehicle body, a single pinion planetary gear 15 for deceleration, a compound planetary gear 16 for shifting, an output shaft 17, clutches C-1 to C-3, and brakes B-1 to B-3.

The single pinion planetary gear 15 for deceleration is connected to the input shaft 14 and serves as a mechanical reduction gear in which decelerated rotating members generate a decelerated rotation with a rotational speed slower than the rotation of the input shaft 14. In addition, the single pinion planetary gear 15 for deceleration includes a sun gear S1 with a regulated rotation that is connected to a case 12, a carrier C1 that rotatably supports a pinion 18 meshed with the sun gear S1, and a ring gear R1 that is connected to the input shaft 14 and meshed with the pinion 18, wherein the carrier C1 functions as a decelerated rotating member.

The compound planetary gear 16 for shifting is structured with combined and commonized carriers C2, C3 in a first single pinion planetary gear 21 and a second double pinion planetary gear 22. Namely, the compound planetary gear 16 for shifting is provided with first and second sun gears S2, S3 that are each rotatably and rotatably supported on the common axis line 13; a stepped pinion 25 forming a major diameter pinion 23 meshed with the first sun gear S2 and a minor diameter pinion 24 meshed with the second sun gear S3 via an intermediate pinion 26; combined first and second carriers C2, C3 that rotatably support the stepped pinion 25 and the intermediate pinion 26; and a first ring gear R2 meshed with the major diameter pinion 23 as well as a second ring gear R3 meshed with the minor diameter pinion 24.

The first sun gear S2 of the compound planetary gear 16 for shifting is connected to and capable of engaging/disengaging with the carrier C1 of the single pinion planetary gear 15 for deceleration via the third clutch C-3, in addition to being connected to and capable of engaging/disengaging with the transmission case 12 via the first brake B-1. The combined first and second carriers C2, C3 are connected to and capable of engaging/disengaging with the input shaft 14 via the second clutch C-2, in addition to being connected to and capable of engaging/disengaging with the case 12 via the second brake B-2. The first ring gear R2 is connected to and capable of engaging/disengaging with the case 12 via the third brake B-3. The second ring gear R3 is constantly connected to the output shaft 17. The second sun gear S3 is connected to and capable of engaging/disengaging with the carrier C1 via the first clutch C-1.

Note that a pump impeller 30 of the fluid torque converter 11 is rotationally driven by an engine (not shown) to send out oil such that a stator 31 receives the reaction force of the oil to generate torque for a turbine 32. The input shaft 14 is directly connected to the turbine 32. Reference numeral 33 denotes a lock-up clutch connecting the pump impeller 30 and the turbine 32.

The automatic transmission 10 structured as described above selectively engages and disengages the first through third clutches C-1 to C-3 and the first through third brakes B-1 to B-3, and selectively connects or immobilizes the input shaft 14, output shaft 17, and each element of the single pinion planetary gear 15 for deceleration and compound planetary gear 16 for shifting, thereby achieving gear ratios for seven forward speeds and two reverse speeds. In FIG. 2, black dots in each clutch and brake column corresponding to each gear speed indicate an engagement state in the case of a clutch, and a stopped state in the case of a brake.

For the first single pinion planetary gear 21 of the single pinion planetary gear 15 for deceleration and the compound planetary gear 16 for shifting, the relation among a rotational speed Ns of the sun gear, a rotational speed Nc of the carrier, a rotational speed Nr of the ring gear and a gear ratio λ of the single pinion planetary gear is shown in equation (1), whereas for the second double pinion planetary gear 22 of the compound planetary gear 16 for shifting, the relation among the rotational speed Ns of the sun gear, the rotational speed Nc of the carrier, the rotational speed Nr of the ring gear and the gear ratio λ of the double pinion planetary gear is shown in equation (2). The gear ratio for each gear speed is calculated based upon the equations (1), (2). Thus, the gear ratios of the single pinion planetary gear 15 for deceleration, the first single pinion planetary gear 21 and the second double pinion planetary gear 22 are λ1=Zs1/Zr1, λ2=Zs2/Zr2, λ3=Zs3/Zr3, where Zs1, Zs2, Zs3 are the number of teeth in the sun gears S1, S2, S3, and Zr1, Zr2, Zr3 are the number of teeth in the ring gears R1, R2, R3.

$$Nr=(1+\lambda)Nc-\lambda N_s \quad (1)$$

$$Nr=(1-\lambda)Nc+\lambda N_s \quad (2)$$

Figure 3:
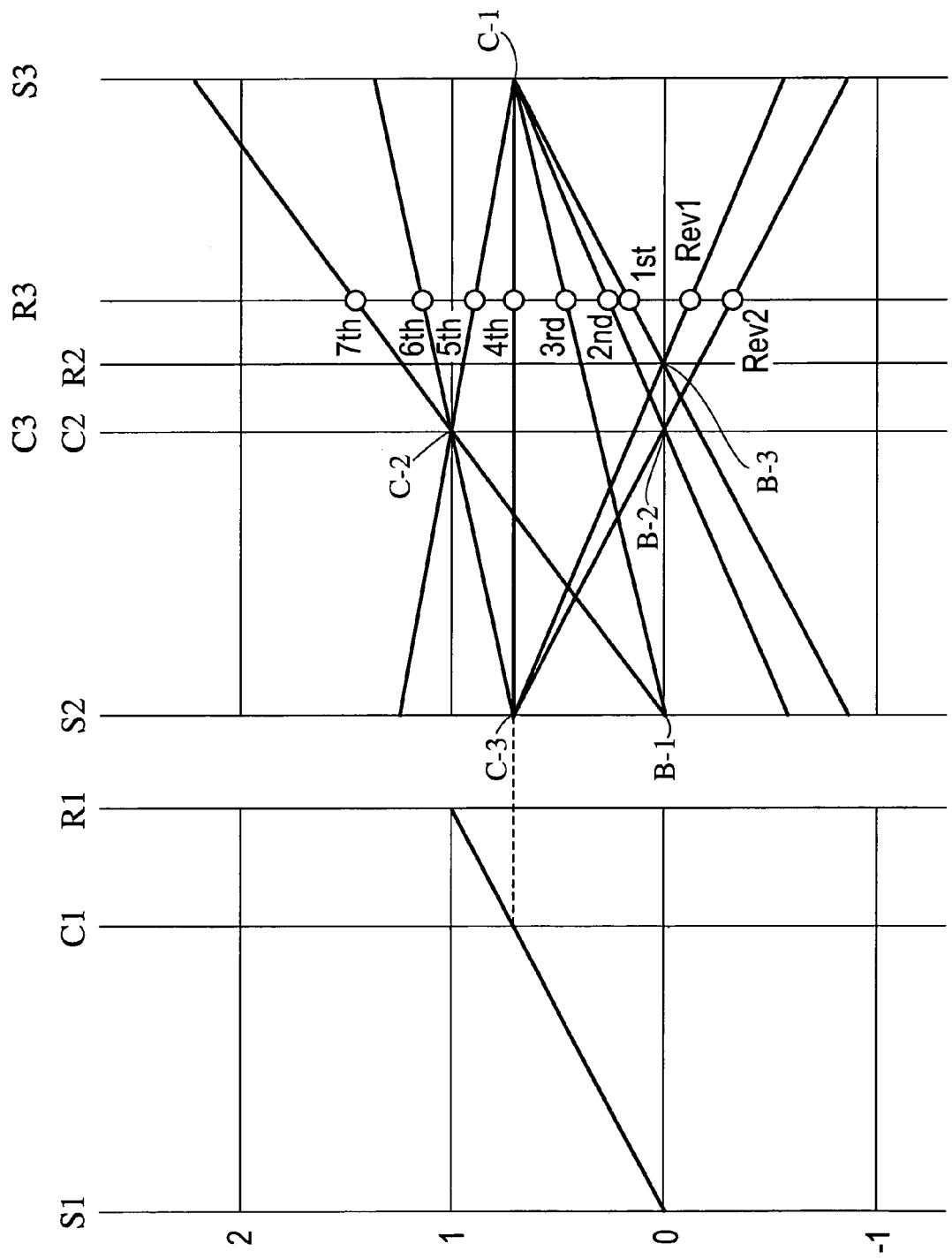
FIG. 3 is a velocity diagram showing a rotation ratio of each element of a planetary gear in each gear speed of the first embodiment.

When the first through third clutches C-1 to C-3 are selectively connected and the first through third brakes B-1 to B-3 are selectively operated, the speed ratio of each element of the single pinion planetary gear 15 for deceleration and the compound planetary gear 16 for shifting becomes as shown in the velocity diagram of FIG. 3. The velocity diagram finds speed ratios by locating each element consisting of the sun gears, carriers and ring gears of the planetary gears at intervals corresponding to the gear ratios in the horizontal axis direction, and corresponding to the rotational state of each element in the vertical axis direction.

In FIG. 3, the velocity diagrams of the single pinion planetary gear 15 for deceleration and the compound planetary gear 16 for shifting are shown side by side. In the compound planetary gear 16 for shifting, the first and second carriers C2 and C3 of the first single pinion planetary gear 21 and the second double pinion planetary gear 22 are directly connected, therefore, the speed ratio of the combined first and second carriers C2, C3 is shown on one vertical line labeled C2, C3. Regarding the single pinion planetary gear 15 for deceleration, the interval between the vertical line of the carrier C1 and the vertical line of the sun gear S1 is considered 1, and the vertical line of the ring gear R1 is located at an interval λ1 from the vertical line of the carrier C1 on the opposite side of the vertical line of the sun gear S1. Regarding the first single pinion planetary gear 21, the interval between the vertical line of the carrier C2 and the vertical line of the sun gear S2 is considered 1, and the vertical line of the ring gear R2 is located at an interval λ2 from the vertical line of the carrier C2 on the opposite side of the vertical line of the sun gear S2. Regarding the second double pinion planetary gear 22, the interval between the vertical line of the carrier C3 and the vertical line of the sun gear S3 is considered 1, and the vertical line of the ring gear R3 is located at an interval λ3 from the vertical line of the carrier C3 on the same side as the vertical line of the sun gear S3. In the velocity diagram, points are labeled C-1 to C-3 and B-1 to B-3 where the first through third clutches C-1 to C-3 and the first through third brakes B-1 to B-3 are selectively operated.

In the velocity diagram of the compound planetary gear 16 for shifting created as described above, elements corresponding to each of the five vertical lines are, starting from the leftmost vertical line, designated a first, second, third, fourth, and fifth elements. Regarding the compound planetary gear 16 for shifting in the case of the first embodiment, the first sun gear S2 is the first element; the combined first and second carriers C2, C3 are the second element; the first ring gear R2 is the third element; the second ring gear R3 is the fourth element; and the second sun gear S3 is the fifth element.

Figure 4:
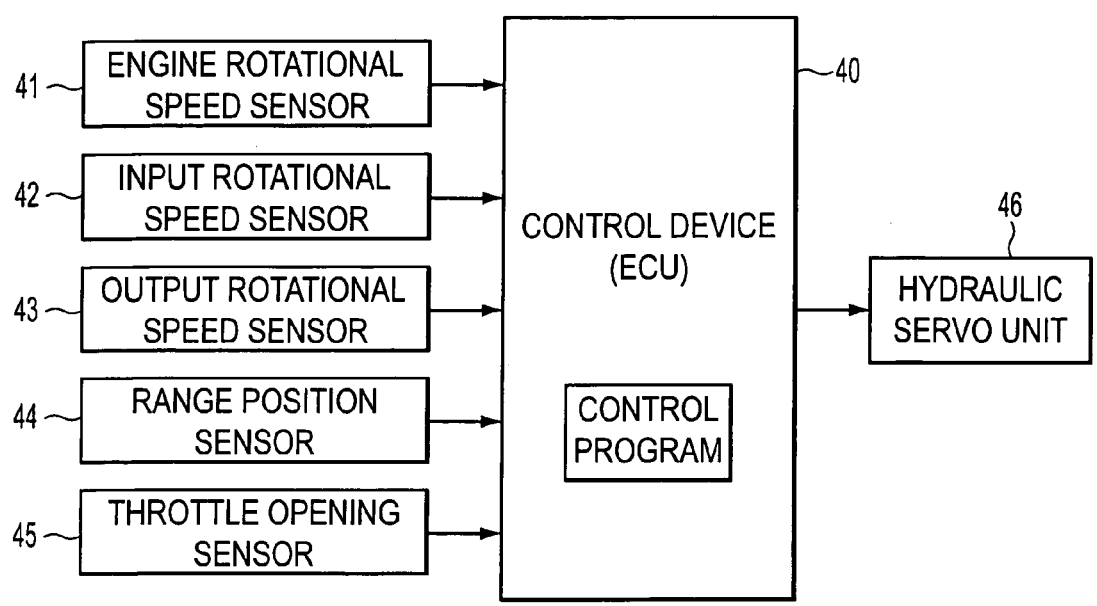
FIG. 4 is a block diagram showing a control device.

A control device of the automatic transmission 10 will be described based upon a block diagram shown in FIG. 4. Detection signals are input into a control device 40 built into a CPU from an engine rotational speed sensor 41 that detects an engine side rotational speed Ne of the torque converter 11 to which the engine rotation is transmitted, an input rotational speed sensor 42 that detects a rotational speed Ni of the input shaft 14, an output rotational speed sensor 43 that detects a rotational speed Nv of the output shaft 17, a range position sensor 44 that sends a detection signal D, N, or R when a shift lever is shifted to the forward traveling range D, neutral range N, or reverse traveling range R; a throttle opening sensor 45 that detects an accelerator depression amount Ss or the like. Based upon these detection signals, the control device selects the optimum gear speed and outputs a control current to each hydraulic servo unit 46 which operate each clutch and brake, in order to selectively engage and disengage the first through third clutches C-1 to C-3 and the first through third brakes B-1 to B-3 as shown in FIG. 2, thereby achieving seven forward speeds and two reverse speeds.

Hereinafter, the operation of each gear speed will be described. For a forward first speed where the first clutch C1 and the third brake B-3 are engaged by the control device 40, the rotation of the carrier C-1 of the single pinion planetary gear 15 for deceleration is input to the second sun gear S3, which is the fifth element of the compound planetary gear 16 for shifting, via the first clutch C-1, and the first ring gear R2, which is the third element, is stopped from rotation by the third brake B-3. Therefore, the second ring gear R3, which is the fourth element, and the output shaft 17 by extension decelerate and are positively rotated at the first speed gear ratio.

For a second speed where the first clutch C1 is engaged and the second brake B-2 is operated, the rotation of the carrier C1 of the single pinion planetary gear 15 for deceleration is input to the second sun gear S3, which is the fifth element, via the first clutch C-1, and the first and second carriers C2, C3, which are the second element, are stopped from rotation by the second brake B-2. Therefore, the second ring gear R3 and the output shaft 17 by extension decelerate and are positively rotated at the second speed gear ratio.

For a third speed where the first clutch C-1 is engaged and the first brake B-1 is operated, the rotation of the carrier C1 of the single pinion planetary gear 15 for deceleration is input to the second sun gear S3, which is the fifth element, via the first clutch C-1, and the first sun gear S2, which is the first element, is stopped from rotation by the first brake B-1. Therefore, the second ring gear R3 and the output shaft 17 by extension decelerate and are positively rotated at the third speed gear ratio.

For a fourth speed where the first and third clutches C-1, C-3 are engaged, the rotation of the carrier C1 of the single pinion planetary gear 15 for deceleration is input to the second and first sun gears S3, S2, which are the fifth and first elements, via the first and third clutches C-1, C-3, thereby fixedly rotating the compound planetary gear 16 for shifting with the single pinion planetary gear 15 for deceleration. Therefore, the second ring gear R3 and the output shaft 17 by extension are positively rotated at the fourth speed gear ratio, in which the input shaft 14 is decelerated by the single pinion planetary gear 15 for deceleration.

For a fifth speed where the first and second clutches C-1, C-2 are engaged, the rotation of the carrier C1 of the single pinion planetary gear 15 for deceleration is input to the second sun gear S3, which is the fifth element, via the first clutch C-1, and the rotation of the input shaft 14 is input to the first and second carriers C2, C3, which are the second element, via the second clutch C-2. Therefore, the second ring gear R3 and the output shaft 17 by extension decelerate and are positively rotated at the fifth speed gear ratio.

For a sixth speed where the second and third clutches C-2, C-3 are engaged, the rotation of the input shaft 14 is input to the combined first and second carriers C2, C3, which are the second element, via the second clutch C-2, and the rotation of the carrier C1 of the single pinion planetary gear 15 for deceleration is input to the first sun gear S2, which is the first element, via the third clutch C-3. Therefore, the second ring gear R3 and the output shaft 17 by extension accelerate and are positively rotated at the sixth speed gear ratio.

For a seventh speed where the second clutch C-2 is engaged and the first brake B-1 is operated, the first sun gear S2, which is the first element, is stopped from rotation and the rotation of the input shaft 14 is input to the combined first and second carriers C2, C3, which are the second element, via the second clutch C-2. Therefore, the second ring gear R3 and the output shaft 17 by extension accelerate and are positively rotated at the seventh speed gear ratio.

For a first reverse speed where the third clutch C-3 and the third brake B-3 are engaged, the rotation of the carrier C1 of the single pinion gear 15 for deceleration is input to the first sun gear S2, which is the first element, via the third clutch C-3, and the first ring gear R2, which is the third element, is stopped from rotation by the third brake B-3. Therefore, the second ring gear R3 and the output shaft 17 by extension decelerate and are negatively rotated at the first reverse speed gear ratio.

For a second reverse speed where the third clutch C-3 and the second brake B-2 are engaged, the rotation of the carrier C1 of the single pinion planetary gear 15 for deceleration is input to the first sun gear S2, which is the first element, via the third clutch C-3, and the combined first and second carriers C2, C3, which are the second element, are stopped from rotation by the second brake B-2. Therefore, the second ring gear R3 and the output shaft 17 by extension decelerate and are negatively rotated at the second reverse speed gear ratio.

As evident from the velocity diagram in FIG. 3, which shows the rotation ratios of the first sun gear S2, the combined first and second carriers C2, C3, the first ring gear R2, the second ring gear R3, and the second sun gear S3 for each gear speed where the rotational speed of the input shaft 14 is 1, the rotation ratio, i.e., the gear ratio, of the second ring gear R3 that is the fourth element for each gear speed, is arranged at suitable intervals so that it is possible to obtain gear ratios for seven forward speeds and two reverse speeds appropriately spaced according to the automatic transmission of the invention.

Hereinafter, other embodiments will be described. The other embodiments are identical to the first embodiment except for the structure of the compound planetary gear for shifting. Therefore, only points different from the first embodiment will be described. Identical portions are labeled the same in drawings, the detailed descriptions of which are omitted.

Figure 5:
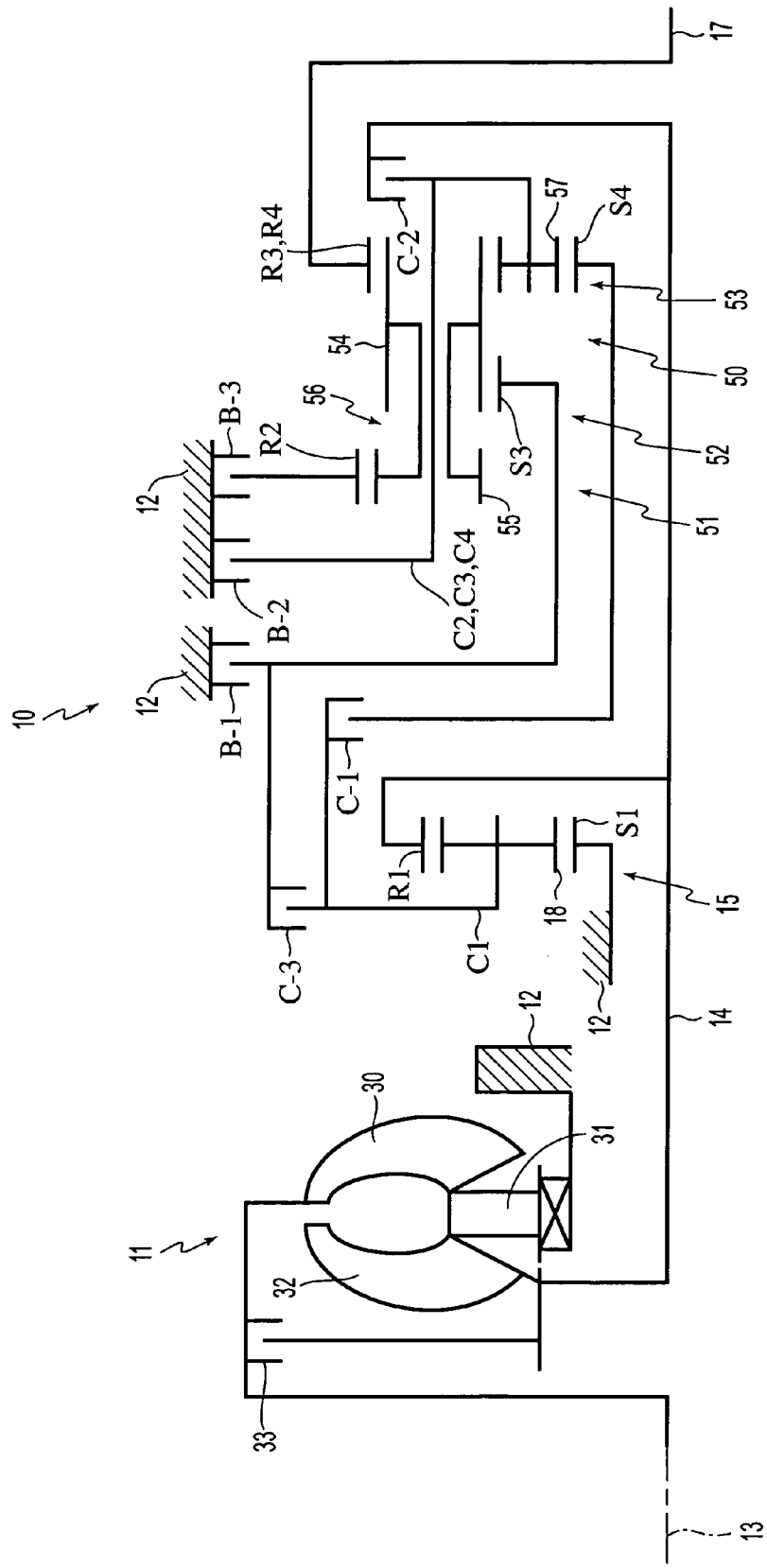
FIG. 5 is a skeleton drawing showing a second embodiment.

In a second embodiment, a compound planetary gear 50 for shifting as shown in FIG. 5 is structured with the second and third ring gears R3, R4 as well as the first through third carriers C2, C3, C4 which are combined and commonized in a first and second single pinion planetary gears 51, 52 as well as a third double pinion planetary gear 53, respectively. More specifically, the compound planetary gear 50 for shifting is structured by the second and third sun gears S3, S4 rotatably supported on the common axis line 13; a stepped pinion 56 forming a minor diameter pinion 54 and a major diameter pinion 55 directly meshed with the second sun gear S3 and meshed with the third sun gear S4 via an intermediate pinion 57; the combined first through third carriers C2, C3, C4 that rotatably support the stepped pinion 56 and the intermediate pinion 57; and the first ring gear R2 that meshes with the major diameter pinion 55, as well as the combined second and third ring gears R3, R4 that are meshed with the minor diameter pinion 54.

Figure 6:
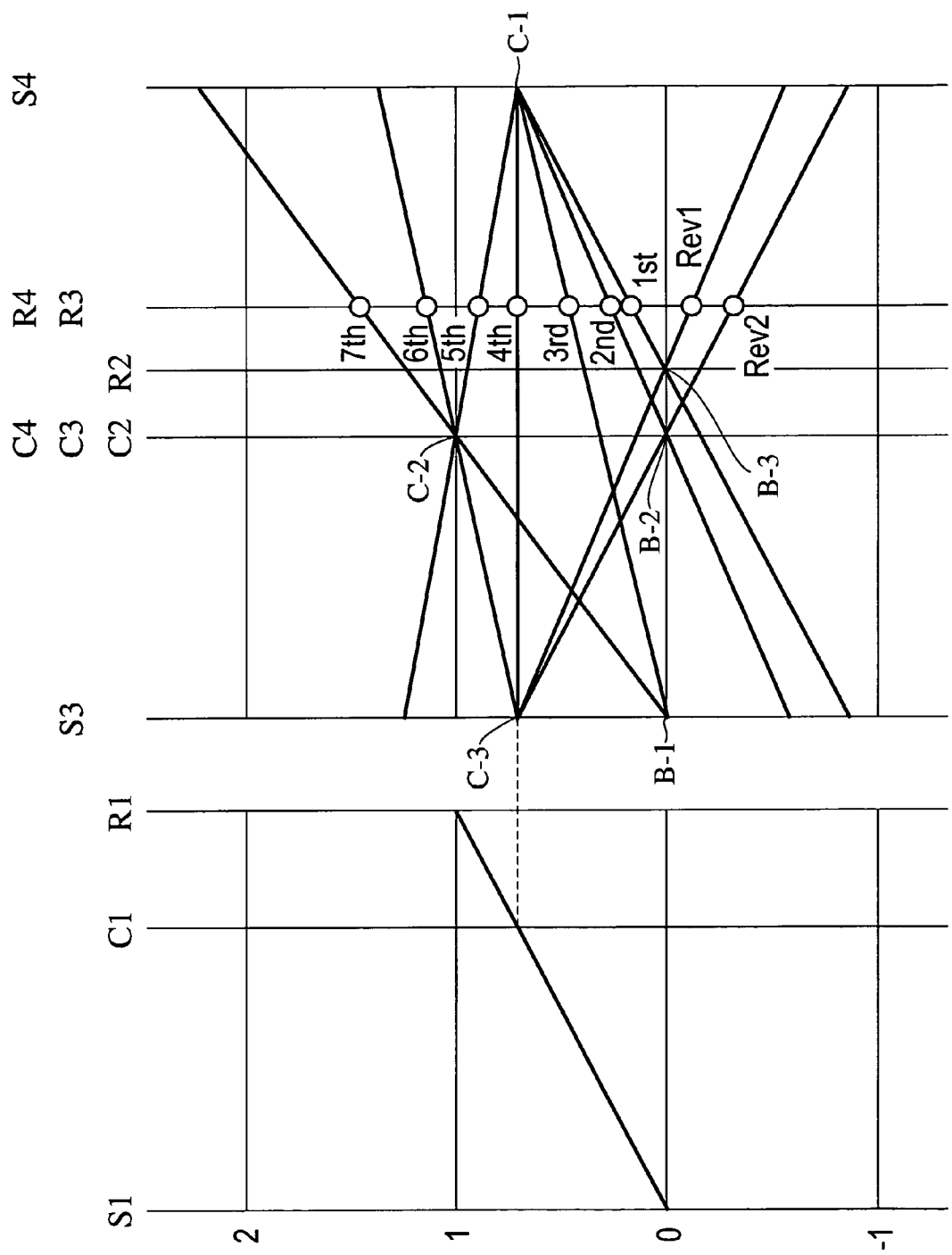
FIG. 6 is a velocity diagram of the second embodiment.

The second sun gear S3 as the first element is connected to and capable of engaging/disengaging with the carrier C1 of the single pinion planetary gear 15 for deceleration via the third clutch C-3, and connected to and capable of engaging/disengaging with the case 12 via the first brake B-1. The first through third carriers C2, C3, C4 as the second element are combined to each other and connected to and capable of engaging/disengaging with the input shaft 14 via the second clutch C-2, and connected to and capable of engaging/disengaging with the case 12 via the second brake B-2. The first ring gear R2 as the third element is connected to and capable of engaging/disengaging with the case 12 via the third brake B-3. The combined second and third ring gears R3, R4 as the fourth element are constantly connected with the output shaft 17. The third sun gear S4 as the fifth element is connected to and capable of engaging/disengaging with the carrier C1 via the first clutch C-1. The engagement state of each clutch and brake for each gear speed is identical to that in the first embodiment. A velocity diagram is shown in FIG. 6. Since the operation is substantially identical to that of the first embodiment, the description is omitted.

Figure 7:
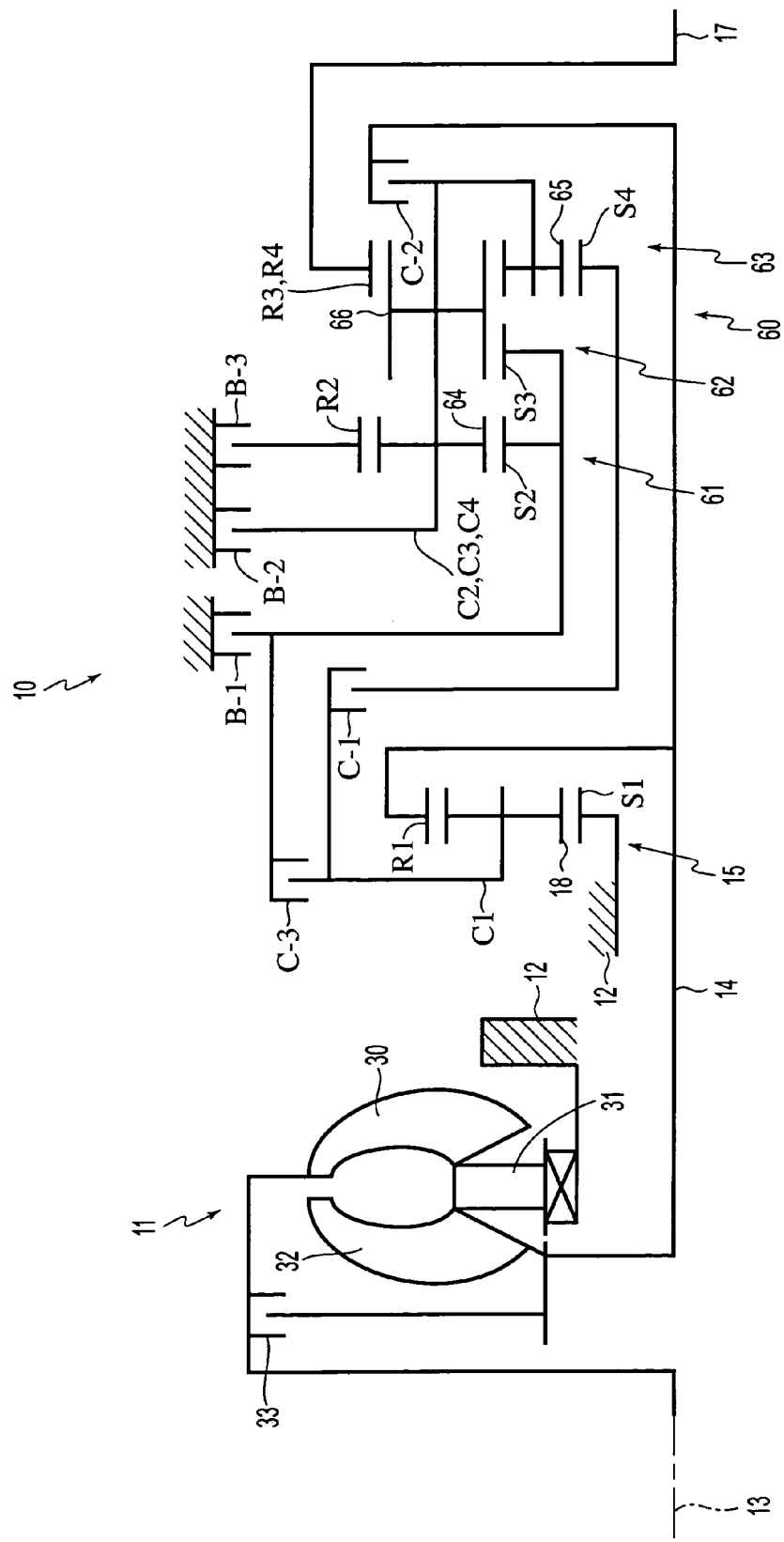
FIG. 7 is a skeleton drawing showing a third embodiment.

In a third embodiment, a compound planetary gear 60 for shifting as shown in FIG. 7 is structured with the first and second sun gears S2, S3, the first, second and third carriers C2, C3, C4, and the second and third ring gears R3, R4 which are directly connected and commonized, respectively, in a first single pinion planetary gear 61, a second single pinion planetary gear 62 and a third double pinion planetary gear 63 disposed on the common axis line 13. More specifically, the compound planetary gear 60 for shifting is structured by the directly connected first and second sun gears S2, S3 and the third sun gear S4; a first pinion 64 meshed with the first sun gear S2; a long pinion 66 directly meshed with the second sun gear S3 and meshed with the third sun gear S4 via a second pinion 65; the combined first through third carriers C2 to C4 that rotatably support the long pinion 66 and the first and second pinions 64, 65; and the first ring gear R2 meshed with the first pinion 64 as well as the combined second and third ring gears R3, R4 meshed with the long pinion 66. The directly connected first and second sun gears S2, S3 as the first element are connected to and capable of engaging/disengaging with the carrier C1 of the single pinion planetary gear 15 for deceleration via the third clutch C-3, and connected to and capable of engaging/disengaging with the case 12 via the first brake B-1. The combined first through third carriers C2 to C4 as the second element are connected to and capable of engaging/disengaging with the input shaft 14 via the second clutch C-2, and connected to and capable of engaging/disengaging with the case 12 via the second brake B-2. The first ring gear R2 as the third element is connected to and capable of engaging/disengaging with the case 12 via the third brake B-3. The combined second and third ring gears R3, R4 as the fourth element are constantly connected to the output shaft 17. The third sun gear S4 as the fifth element is connected to and capable of engaging/disengaging with the carrier C1 via the first clutch C-1.

Figure 8:
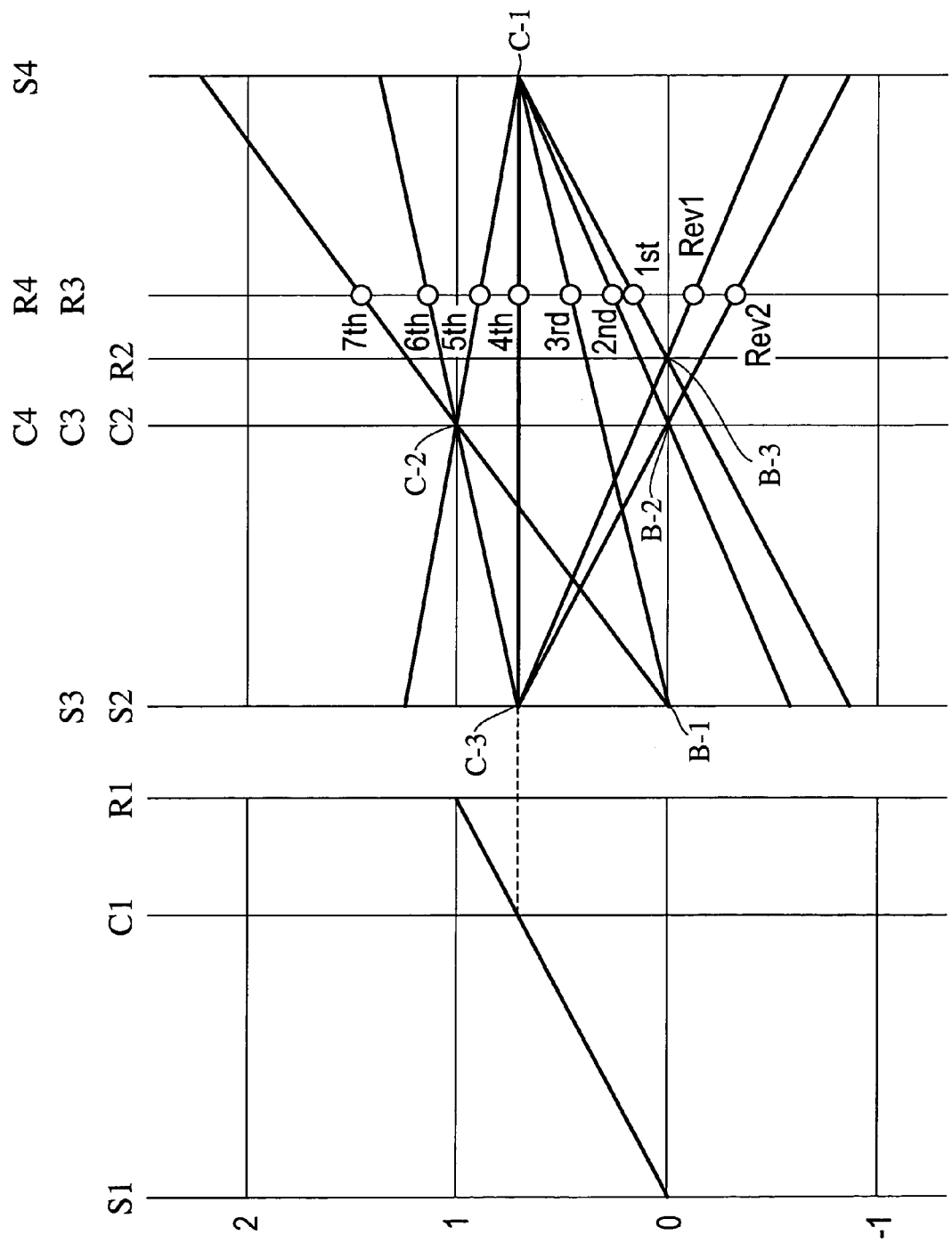
FIG. 8 is a velocity diagram of the third embodiment.

The engagement state of each clutch and brake for each gear speed is identical to that in the first embodiment. A velocity diagram is shown in FIG. 8. Descriptions are omitted since the operation is substantially identical if the first sun gear S2 that is the first element, the combined first and second carriers C2, C3 that are the second element, the first ring gear R2 that is the third element, the second ring gear R3 that is the fourth element, and the second sun gear S3 that is the fifth element in the first embodiment are respectively replaced with the directly connected first and second sun gears S2, S3 that are the first element, the combined first through third carriers C2 to C4 that are the second element, the first ring gear R2 that is the third element, the combined second and third ring gears R3, R4 that are the fourth element, and the third sun gear S4 that is the fifth element in the third embodiment.

Figure 9:
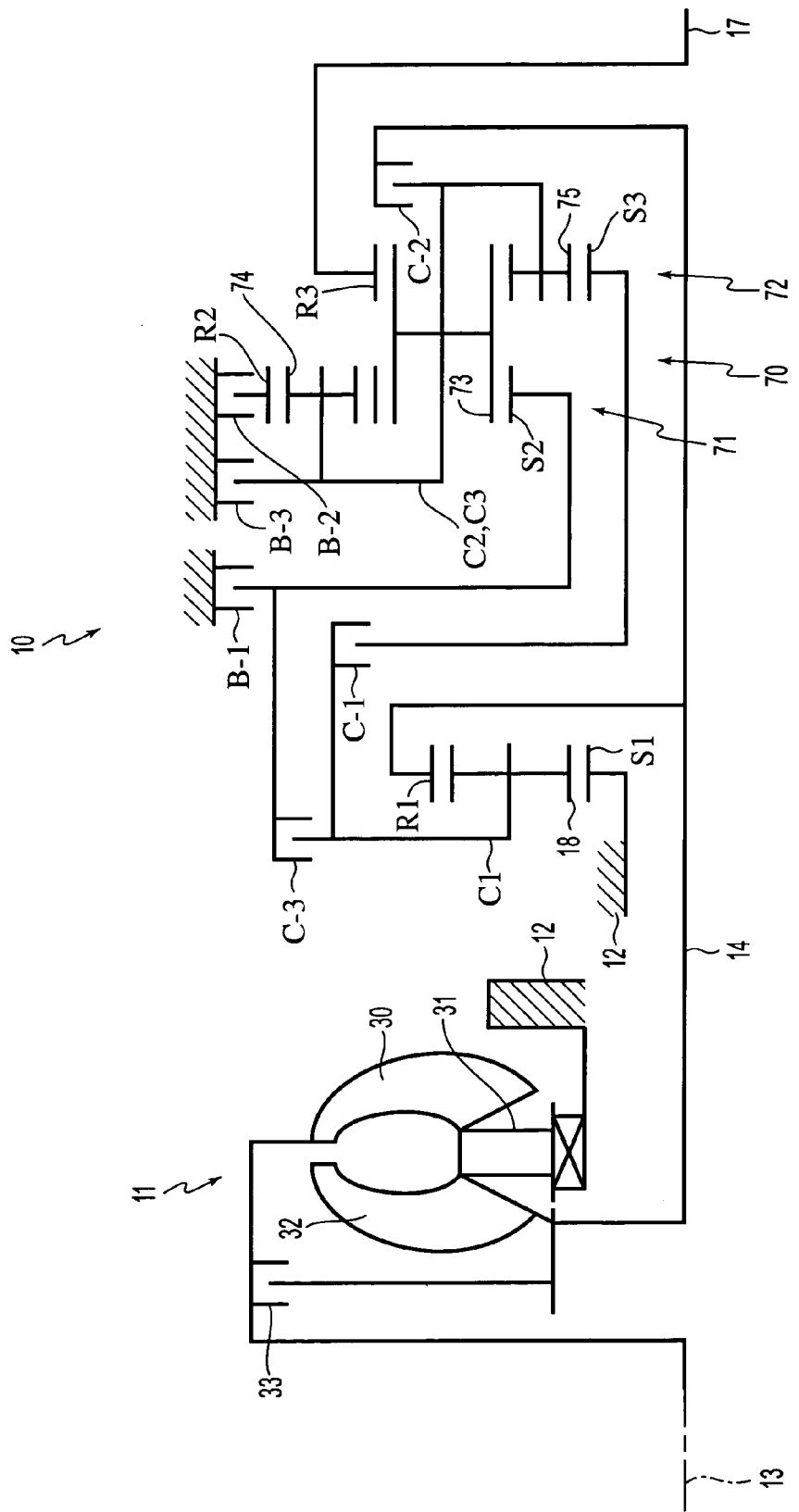
FIG. 9 is a skeleton drawing showing a fourth embodiment.
Figure 11:
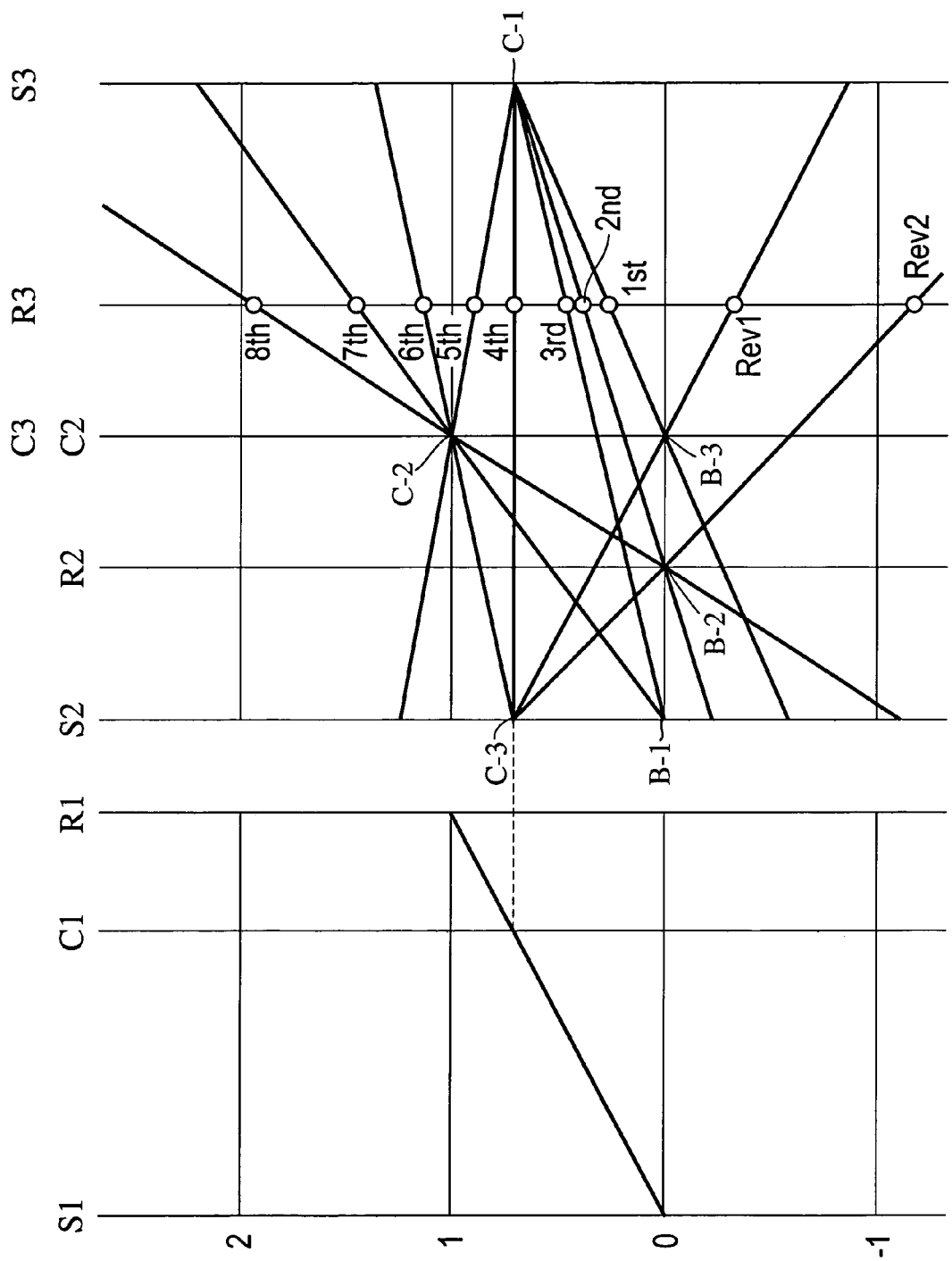
FIG. 11 is a velocity diagram of the fourth embodiment.

In a fourth embodiment, a compound planetary gear 70 for shifting as shown in FIG. 9 is structured with the first and second carriers C2, C3 which are combined and commonized in a first and second double pinion planetary gears 71, 72 disposed on the common axis line 13. More specifically, the compound planetary gear 70 for shifting is structured by the first sun gear S2; a long pinion 73 directly meshed with the first sun gear S2; the first ring gear R2 meshed with the long pinion 73 via a first pinion 74; the second sun gear S3 meshed with the long pinion 73 via a second pinion 75; the combined first and second carriers C2, C3 that rotatably support the long pinion 73 and the first and second pinions 74, 75, respectively; and the second ring gear R3 directly meshed with the long pinion 73. Furthermore, the first sun gear S2 as the first element is connected to and capable of engaging/disengaging with the carrier C1 of the single pinion planetary gear 15 for deceleration via the third clutch C-3, and connected to and capable of engaging/disengaging with the case 12 via the first brake B-1. The first ring gear R2 as the second element is connected to and capable of engaging/disengaging with the case 12 via the second brake B-2. The combined first and second carriers C2, C3 as the third element are connected to and capable of engaging/disengaging with the input shaft 14 via the second clutch C-2, and connected to and capable of engaging/disengaging with the case 12 via the third brake B-3. The second ring gear R3 as the fourth element is constantly connected to the output shaft 17. The second sun gear S3 as the fifth element is connected to and capable of engaging/disengaging with the carrier C1 via the first clutch C-1. The engagement state of each clutch and brake for each gear speed is shown in FIG. 10. The velocity diagram is shown in FIG. 11.

Hereinafter, the operation of each gear speed will be described. For a forward first speed where the first clutch C-1 and the third brake B-3 are engaged by the control device 40, the rotation of the carrier C1 of the single pinion planetary gear 15 for deceleration is input to the second sun gear S3, which is the fifth element of the compound planetary gear 16 for shifting, via the first clutch C-1, and the first and second carriers C2, C3, which are the third element, are stopped from rotation by the third brake B-3. Therefore, the second ring gear R3, which is the fourth element, and the output shaft 17 by extension decelerate and are positively rotated at the first speed gear ratio.

For a second speed where the first clutch C-1 and the second brake B-2 are engaged, the rotation of the carrier C1 is input to the second sun gear S3 via the first clutch C-1, and the first ring gear R2 is stopped from rotation by the second brake B-2. Therefore, the second ring gear R3 and the output shaft 17 by extension decelerate and are positively rotated at the second speed gear ratio.

For a third speed where the first clutch C-1 and the first brake B-1 are engaged, the rotation of the carrier C1 is input to the second sun gear S3 via the first clutch C-1, and the first sun gear S2 is stopped from rotation by the first brake B-1. Therefore, the second ring gear R3 and the output shaft 17 by extension decelerate and are positively rotated at the third speed gear ratio.

For a fourth speed where the first and third clutches C-1, C-3 are engaged, the rotation of the carrier C1 is input to the second and first sun gears S3, S2 via the first and third clutches C-1, C-3, thereby fixedly rotating the compound planetary gear 70 for shifting with the single pinion planetary gear 15 for deceleration. Therefore, the second ring gear R3 and the output shaft 17 by extension are positively rotated at the fourth speed gear ratio, in which the input shaft 14 is decelerated by the single pinion planetary gear 15 for deceleration.

For a fifth speed where the first and second clutches C-1, C-2 are engaged, the rotation of the carrier C1 is input to the second sun gear S3 via the first clutch C-1, and the rotation of the input shaft 14 is input to the combined first and second carriers C2, C3 via the second clutch C-2. Therefore, the second ring gear R3 and the output shaft 17 by extension decelerate and are positively rotated at the fifth speed gear ratio.

For a sixth speed where the second and third clutches C-2, C-3 are engaged, the rotation of the input shaft 14 is input to the combined first and second carriers C2, C3 via the second clutch C-2, and the rotation of the carrier C1 is input to the first sun gear S2 via the third clutch C-3. Therefore, the second ring gear R3 and the output shaft 17 by extension accelerate and are positively rotated at the sixth speed gear ratio.

For a seventh speed where the second clutch C-2 and the first brake B-1 are engaged, the rotation of the input shaft 14 is input to the combined first and second carriers C2, C3 via the second clutch C-2, and the first sun gear S2 is stopped from rotation by the first brake B-1. Therefore, the second ring gear R3 and the output shaft 1.7 by extension accelerate and are positively rotated at the seventh speed gear ratio.

For an eighth speed where the second clutch C-2 and the second brake B-2 are engaged, the rotation of the input shaft 14 is input to the combined first and second carriers C2, C3 via the second clutch C-2, and the first ring gear R2 is stopped from rotation by the second brake B-2. Therefore, the second ring gear R3 and the output shaft 17 by extension accelerate and are positively rotated at the eighth speed gear ratio.

For a first reverse speed where the third clutch C-3 and the third brake B-3 are engaged, the rotation of the carrier C1 is input to the first sun gear S2 via the third clutch C-3, and combined first and second carriers C2, C3 are stopped from rotation by the third brake B-3. Therefore, the second ring gear R3 and the output shaft 17 by extension decelerate and are negatively rotated at the first reverse speed gear ratio.

For a second reverse speed where the third clutch C-3 and the second brake B-2 are engaged, the rotation of the carrier C1 is input to the first sun gear S2 via the third clutch C-3, and the first ring gear R2 is stopped from rotation by the second brake B-2. Therefore, the second ring gear R3 and the output shaft 17 by extension decelerate and are negatively rotated at the second reverse speed gear ratio.

Figure 12:
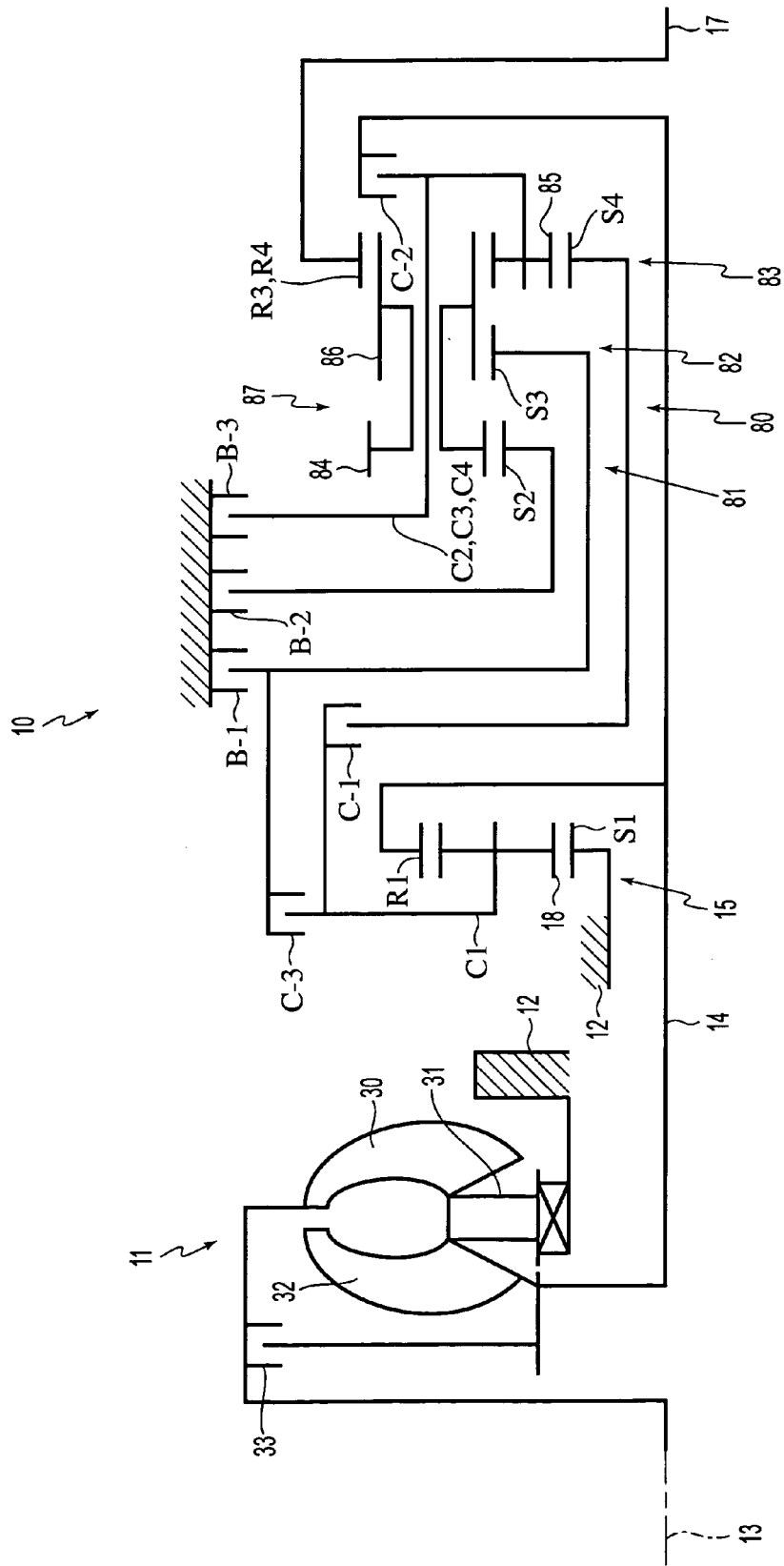
FIG. 12 is a skeleton drawing showing a fifth embodiment.

In a fifth embodiment, a compound planetary gear 80 for shifting as shown in FIG. 12 is structured with the first through third carriers C2 to C4 as well as the second and third ring gears R3, R4 which are combined and commonized in a first single pinion planetary gears 81, a second single pinion planetary gears 82, as well as a third double pinion planetary gear 83, respectively, disposed on the common axis line 13. More specifically, the compound planetary gear 80 for shifting is structured by the first, second and third sun gears S2, S3, S4; a stepped pinion 87 forming a major diameter pinion 84 directly meshed with the first sun gear S2 and a minor diameter pinion 86 that is directly meshed with the second sun gear S3 and meshed with the third sun gear S4 via an intermediate pinion 85; the first through third carriers C2 to C4 that rotatably support the stepped pinion 87 and the intermediate pinion 85; and the second and third ring gears R3, R4 that are meshed with the minor diameter pinion 86.

The second sun gear S3 as the first element is connected to and capable of engaging/disengaging with the carrier C1 of the single pinion planetary gear 15 for deceleration via the third clutch C-3, and connected to and capable of engaging/disengaging with the case 12 via the first brake B-1. The first sun gear S2 as the second element is connected to and capable of engaging/disengaging with the case 12 via the second brake B-2. The combined first through third carriers C2 to C4 as the third element are connected to and capable of engaging/disengaging with the input shaft 14 via the second clutch C-2, and connected to and capable of engaging/disengaging with the case 12 via the third brake B-3. The combined second and third ring gears R3, R4 as the fourth element are constantly connected with the output shaft 17. The third sun gear S4 as the fifth element is connected to and capable of engaging/disengaging with the carrier C1 via the first clutch C-1.

Figure 13:
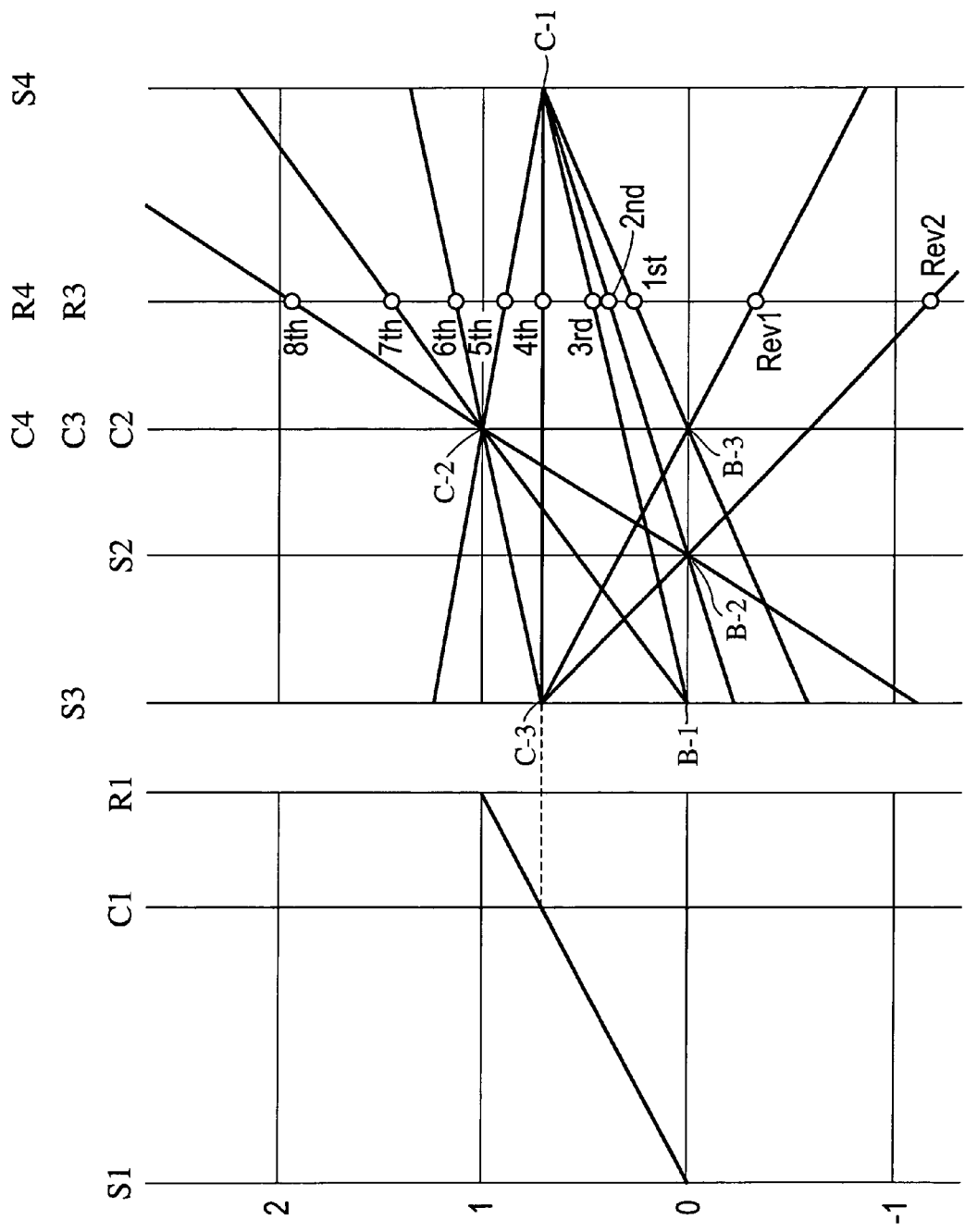
FIG. 13 is a velocity diagram of the fifth embodiment.

The engagement state of each clutch and brake for each gear speed is identical to that in the fourth embodiment. A velocity diagram is shown in FIG. 13. Descriptions are omitted since the operation is substantially identical if the first sun gear S2 that is the first element, the first ring gear R2 that is the second element, the first and second carriers C2, C3 that are the third element, the second ring gear R3 that is the fourth element, and the second sun gear S3 that is the fifth element in the fourth embodiment are respectively replaced with the second sun gear S3 that is the first element, the first sun gear S2 that is the second element, the first through third carriers C2 to C4 that are the third element, the second and third ring gears R3, R4 that are the fourth element, and the third sun gear S4 that is the fifth element in the fifth embodiment.

According to an exemplary aspect of the invention, it is thus possible to provide an automatic transmission capable of shifting and transmitting to the output shaft at gear ratios of multiple speeds that appropriately space the rotation of the input shaft. In addition, the change in gear ratio decreases during gear changes at low gear speeds, thereby obtaining a superior shift feeling when the vehicle starts traveling. Each gear speed can be achieved with only the operation of two among the first through third clutches and first through third brakes, and switching over to an adjacent gear speed can be achieved by only switching over one of the operating clutch or brake.

According to another exemplary aspect of the invention, it is possible to shift and output to the output shaft at gear ratios of multiple speeds that appropriately space the rotation of the input shaft, using a compact structure with a short total length.

According to an other exemplary aspect of the invention, it is thus possible to shift and output to the output shaft at gear ratios of multiple speeds that appropriately space the rotation of the input shaft, using superior gear ratios that are based upon a conventional automatic transmission.

According to another exemplary aspect of the invention, it is thus possible provide an automatic transmission capable of shifting and outputting to the output shaft at gear ratios of multiple speeds that appropriately space the rotation of the input shaft. In addition, it is possible to further compress the gear ratios on the high speed side, thereby drawing out optimum engine performance at vehicle speeds in high speed zones. Moreover, the change in gear ratio decreases during gear changes, thereby obtaining a superior shift feeling. Each gear speed can also be achieved with only the operation of two among the first through third clutches and first through third brakes.

According to another exemplary aspect of the invention, the mechanical reduction gear is thus structured by a simple construction, and it is possible to shift and output to the output shaft at gear ratios of multiple speeds that appropriately space the rotation of the input shaft.

The invention is not limited to the aforementioned embodiments, and various modifications based on the purpose of the invention are possible, which are regarded as within the scope of the invention.

What is claimed is:

1. An automatic transmission comprising:
    a mechanical reduction gear connected to an input shaft that generates a decelerated rotation smaller than a rotation of the input shaft from a decelerated rotating member; and
    a compound planetary gear for shifting with a first element, a second element, a third element, a fourth element, and a fifth element, wherein:
        the first element is capable of being connected to the decelerated rotating member via a third clutch and capable of being stopped from rotating by a first brake,
        the second element is capable of being stopped from rotating by a second brake,
        the third element is capable of being stopped from rotating by a third brake, with either the second element or the third element capable of being connected to the input shaft via a second clutch,
        the fourth element is connected to an output shaft,
        the fifth element is capable of being connected to the decelerated rotating member via a first clutch, and
        at least seven forward speed ratios can be established, wherein (1) a first speed is established by engagement of the first clutch and the third brake, (2) a second speed is established by engagement of the first clutch and the second brake, (3) a third speed is established by engagement of the first clutch and the first brake, (4) a fourth speed is established by engagement of the first clutch and the third clutch, (5) a fifth speed is established by engagement of the first clutch and the second clutch, (6) a sixth speed is established by engagement of the second clutch and the third clutch, and (7) a seventh speed is established by engagement of the second clutch and the first brake.

2. The automatic transmission according to claim 1, wherein:
    the mechanical reduction gear is a single pinion planetary gear comprising a sun gear with a fixed rotation, a carrier that rotatably supports a pinion meshed with the sun gear, and a ring gear connected to the input shaft and meshed with the pinion; and
    the carrier of the single pinion planetary gear is the decelerated rotating member.

3. The automatic transmission according to claim 1, wherein:
    the third element is capable of being connected to the input shaft via the second clutch; and a eighth speed is established by engagement of the second clutch and the second brake.

4. The automatic transmission according to claim 1, wherein the first element, the second element, the third element, the fourth element and the fifth element each correspond to a predetermined order.

5. An automatic transmission comprising:
a mechanical reduction gear connected to an input shaft that generates a decelerated rotation smaller than a rotation of the input shaft from a decelerated rotating member; and
a compound planetary gear for shifting with a first element, a second element, a third element, a fourth element and a fifth element, wherein
the first element is capable of being connected to the decelerated rotating member via a third clutch and capable of being stopped from rotation by a first brake,
the second element is capable of being connected to the input shaft via a second clutch and capable of being stopped from rotation by a second brake,
the third element is capable of being stopped from rotation by a third brake,
the fourth element is connected to an output shaft,
the fifth element is capable of being connected to the decelerated rotating member via a first clutch, and
at least seven forward speed ratios can be established, wherein (1) a first speed is established by engagement of the first clutch and the third brake, (2) a second speed is established by engagement of the first clutch and the second brake, (3) a third speed is established by engagement of the first clutch and the first brake, (4) a fourth speed is established by engagement of the first clutch and the third clutch, (5) a fifth speed is established by engagement of the first clutch and the second clutch, (6) a sixth speed is established by engagement of the second clutch and the third clutch, and (7) a seventh speed is established by engagement of the second clutch and the first brake.

6. The automatic transmission according to claim 5, wherein the compound planetary gear for shifting comprising:
a first sun gear and a second sun gear that are directly connected;
a third sun gear;
a first pinion meshed with the first sun gear;
a long pinion directly meshed with the second sun gear and meshed with the third sun gear via a second pinion;
a first carrier, a second carrier and a third carrier that are combined and that rotatably support the long pinion and the first and second pinions;
a first ring gear meshed with the first pinion; and
a second ring gear and a third ring gear that are combined and meshed with the long pinion, wherein
the first sun gear and the second sun gear that are directly connected are the first element,
the first carrier, the second carrier and the third carrier that are combined are the second element,
the first ring gear is the third element,
the second ring gear and the third ring gear that are combined are the fourth element, and
the third sun gear is the fifth element.

7. The automatic transmission according to claim 5, wherein the mechanical reduction gear is a single pinion planetary gear comprising a sun gear with a fixed rotation, a carrier that rotatably supports a pinion meshed with the sun gear, and a ring gear connected to the input shaft and meshed with the pinion; and
the carrier of the single pinion planetary gear for deceleration is the decelerated rotating member.

8. The automatic transmission according to claim 5, wherein the first element, the second element, the third element, the fourth element and the fifth element each correspond to a predetermined order.

9. The automatic transmission according to claim 5, wherein the compound planetary gear for shifting comprising:
a first sun gear;
a second sun gear;
a stepped pinion forming a first pinion and a long pinion directly meshed with the first sun gear and meshed with the second sun gear via a second pinion;
a first carrier, a second carrier and a third carrier that are combined and that rotatably support the stepped pinion and the second pinion;
a first ring gear meshed with the first pinion; and
a second ring gear and a third ring gear that are combined and are meshed with the long pinion, wherein
the first sun gear is the first element,
the first carrier, the second carrier and the third carrier that are combined are the second element,
the first ring gear is the third element,
the second ring gear and the third ring gear that are combined are the fourth element, and
the second sun gear is the fifth element.

10. The automatic transmission according to claim 9, wherein the first pinion is a major diameter pinion, the long pinion is a minor diameter pinion and the second pinion is an intermediate pinion.

11. The automatic transmission according to claim 5, wherein the compound planetary gear for shifting comprising:
a first sun gear;
a second sun gear;
a stepped pinion forming a first pinion directly meshed with the first sun gear and a second pinion meshed with the second sun gear via a third pinion;
a first carrier and a second carrier that are combined and that rotatably support the stepped pinion and the third pinion;
a first ring gear meshed with the first pinion; and
a second ring gear meshed with the second pinion, wherein
the first sun gear is the first element,
the first carrier and the second carrier that are combined are the second element,
the first ring gear is the third element,
the second ring gear is the fourth element, and
the second sun gear is the fifth element.

12. The automatic transmission according to claim 11, wherein the first pinion is a major diameter pinion, the second pinion is a minor diameter pinion and the third pinion is an intermediate pinion.

* * * * *